United States Patent
Romero Ruiz et al.

(10) Patent No.: US 12,289,223 B2
(45) Date of Patent: Apr. 29, 2025

(54) AUTOMATIC COMMUNICATION NETWORK CONTROL

(71) Applicant: CLEVERNET, INC., San Francisco, CA (US)

(72) Inventors: Ivan Romero Ruiz, Barcelona (ES); Francesco Ciaccia, Barcelona (ES); Mario Nemirovsky, San Francisco, CA (US); René Serral-Gracià, Barcelona (ES)

(73) Assignee: Clevernet, Inc., San Francisco, CA (US)

( * ) Notice: Subject to any disclaimer, the term of this patent is extended or adjusted under 35 U.S.C. 154(b) by 431 days.

(21) Appl. No.: 17/524,746

(22) Filed: Nov. 12, 2021

(65) Prior Publication Data

US 2022/0078121 A1    Mar. 10, 2022

Related U.S. Application Data

(63) Continuation of application No. PCT/US2020/032386, filed on May 11, 2020.
(Continued)

(51) Int. Cl.
*H04L 43/10* (2022.01)
*H04L 41/14* (2022.01)
(Continued)

(52) U.S. Cl.
CPC ............. *H04L 43/10* (2013.01); *H04L 41/14* (2013.01); *H04L 43/0864* (2013.01); *H04L 43/0882* (2013.01); *H04L 47/193* (2013.01)

(58) Field of Classification Search
CPC ............ H04L 47/193; H04L 43/0864; H04L 43/0882; H04L 41/14; H04L 43/0876; H04L 43/0858; H04L 43/10; H04L 69/16
See application file for complete search history.

(56) References Cited

U.S. PATENT DOCUMENTS 7,945,661 B2 * 5/2011 Lehane ............... H04L 43/18
                                                709/224
8,064,345 B2 * 11/2011 Griffoul ............ H04L 69/163
                                                370/235
(Continued)

FOREIGN PATENT DOCUMENTS

WO   WO-2016072836 A1 *  5/2016  ......... H04L 12/6418

OTHER PUBLICATIONS

AProbing:Estimating Available Bandwidth Using ACK Pair Probing, IEEE, 2014 (Year: 2014).*

*Primary Examiner* — Habte Mered
(74) *Attorney, Agent, or Firm* — Stephen W. Melvin

(57) ABSTRACT

A method for managing transmission over a network by adjusting a flow control window based on one or more parameters obtained from one or more connections, applications or network conditions. In one embodiment a controller modifies the receiver TCP advertised window of one or several connections to match the end-to-end bandwidth-delay product (BDP) for bandwidth fair sharing and improving the quality of experience (QoE). The controller can be placed in any given entity managing packets, such as a sender entity, a transmitting entity or any other entity handling connection packets. A mechanism for estimating available path bandwidth and/or link capacity and location by analyzing the distribution of inter-packet arrival times. Packet pair dispersion analysis can be utilized based on passive evaluation of the acknowledgements of a TCP flow or based on active probing. Machine learning using a neural network can be used to analyze the distribution of inter-packet arrival times.

27 Claims, 15 Drawing Sheets

Related U.S. Application Data

(60) Provisional application No. 62/963,536, filed on Jan. 20, 2020, provisional application No. 62/846,543, filed on May 10, 2019.

(51) Int. Cl.
  *H04L 43/0864* (2022.01)
  *H04L 43/0882* (2022.01)
  *H04L 47/193* (2022.01)

(56) References Cited

U.S. PATENT DOCUMENTS

| | | | | |
|---|---|---|---|---|
| 11,228,536 B2 * | 1/2022 | Tinnakornsrisuphap | ............ | H04L 69/164 |
| 11,277,349 B2 * | 3/2022 | Klemetti | ............ | H04L 47/724 |
| 2003/0193893 A1 * | 10/2003 | Wen | ............ | H04Q 11/0478 |
| | | | | 370/231 |
| 2007/0081561 A1 * | 4/2007 | Heninger | ............ | H04L 47/365 |
| | | | | 370/516 |
| 2007/0088845 A1 * | 4/2007 | Memon | ............ | H04L 47/10 |
| | | | | 709/234 |
| 2008/0101227 A1 * | 5/2008 | Fujita | ............ | H04L 45/50 |
| | | | | 370/232 |
| 2008/0247419 A1 * | 10/2008 | Elliot | ............ | H04L 47/11 |
| | | | | 370/468 |
| 2010/0329117 A1 * | 12/2010 | Lee | ............ | H04W 8/04 |
| | | | | 370/235 |
| 2013/0114408 A1 * | 5/2013 | Sastry | ............ | H04L 47/37 |
| | | | | 370/231 |
| 2013/0176854 A1 * | 7/2013 | Chisu | ............ | H04W 80/06 |
| | | | | 370/241 |
| 2013/0315095 A1 * | 11/2013 | Go | ............ | H04L 43/10 |
| | | | | 370/253 |
| 2014/0115186 A1 * | 4/2014 | Weston | ............ | H04L 47/27 |
| | | | | 709/235 |
| 2015/0078167 A1 * | 3/2015 | Papa | ............ | H04W 28/10 |
| | | | | 370/235 |
| 2017/0310601 A1 * | 10/2017 | Yu | ............ | H04L 69/161 |
| 2017/0346751 A1 * | 11/2017 | Barnes | ............ | H04L 47/27 |
| 2017/0353386 A1 * | 12/2017 | Wang | ............ | H04L 47/27 |
| 2018/0018393 A1 * | 1/2018 | Latapie | ............ | H04L 41/145 |
| 2018/0076934 A1 * | 3/2018 | Huitema | ............ | H04L 1/1832 |
| 2018/0302333 A1 * | 10/2018 | Zhang | ............ | H04L 47/27 |
| 2022/0272518 A1 * | 8/2022 | Lee | ............ | H04L 47/11 |

\* cited by examiner

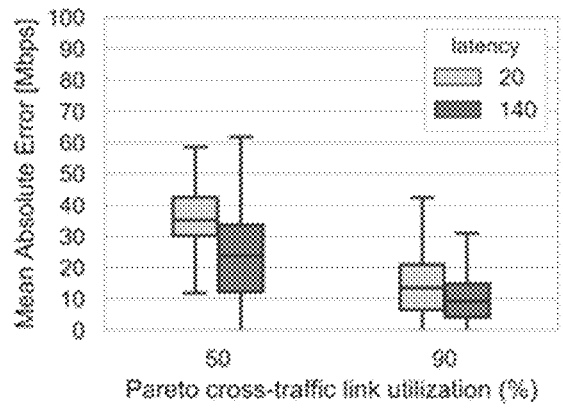 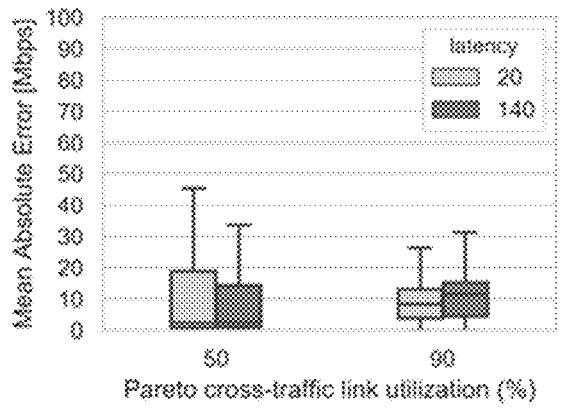
Fig. 11A                    Fig. 11B
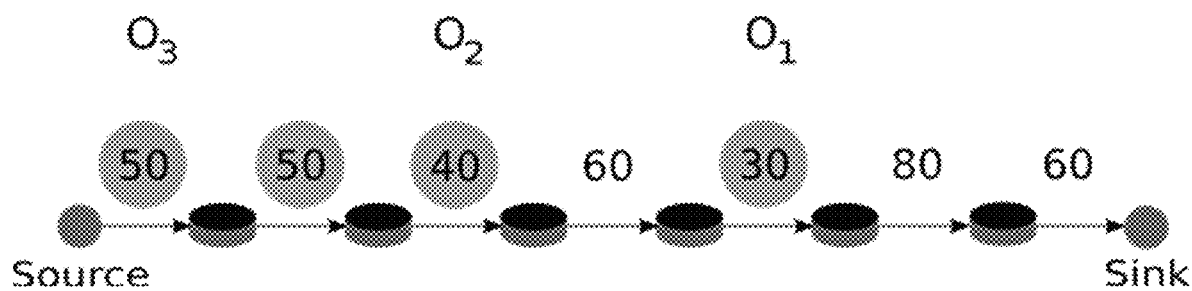
Fig. 12

AUTOMATIC COMMUNICATION NETWORK CONTROL

RELATED APPLICATIONS

This application is a continuation of PCT Application No. PCT/US2020/032386, filed on May 11, 2020, and claims priority to U.S. Provisional Application No. 62/846,543, filed on May 10, 2019, and U.S. Provisional Application No. 62/963,536 filed on Jan. 20, 2020, both of which are incorporated herein by reference.

BACKGROUND

One of the fundamental challenges in packet-based information transport is determining approaches to congestion and flow control fulfilling three principle control objectives: (1) security; (2) fairness and (3) robustness. Receiving entities have a receiver buffer for holding the data that remains in this buffer until it is processed by an application. When data is received much faster than the data is processed, the receive buffer becomes full, resulting in data losses and, with it, data retransmissions. To prevent the sender entity from sending more data than the receiving entity can process, protocols such as Transmission Control Protocol (TCP) define a mechanism called flow-control based on advertising a receive window (RWND). The Receive Window is the maximum amount of data the sender entity is allowed to send to the receiving entity. The RWND can be statically-configured or adaptively tuned (which is known as "dynamic rightsizing"). The RWND is explicitly advertised in the protocol header of each packet belonging to a connection.

BRIEF DESCRIPTION OF THE DRAWINGS

FIG. 11A illustrates a mean absolute error distributions of an embodiment of the invention over a big experimental validation data-set using a heuristic approach;

FIG. 11B illustrates a mean absolute error distribution of an embodiment of the invention over a big experimental validation data-set using a Deep Neural Network discriminator showing considerable improvements in the estimation error;

FIG. 12 illustrates the Smallest Links Capacity Set (SLCS), which is the subset of all the links of an end-to-end path that constitutes a narrow link in one of the sub-segment of the path including the source;

SUMMARY

Figure 1:
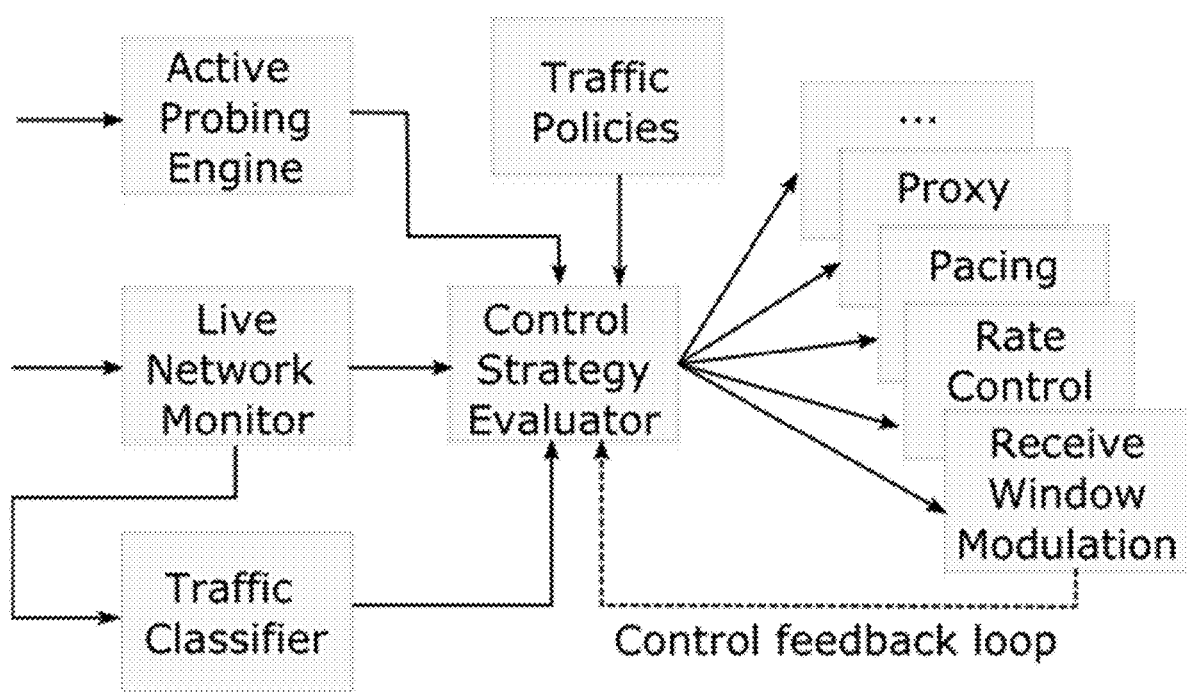
FIG. 1 illustrates an Automatic Communication Network Control (ACNC) node architecture.

Embodiments of the invention are related to the management of communication network resources, in particular bandwidth management. Architectures for bandwidth fair sharing and improving the quality of experience (QoE) are described and can be applied to home gateways and credit-based resource allocation systems that employ the flow control in the place where users are competing for bandwidth in the same network. Congestion events reduce the bitrate of packets sent degrading the QoE. Those methods modify the value of RWND to have a sending rate limited by RWND/RTT (Round Trip Time). In some architectures, the header of each Acknowledgement packet (ACK) at the gateway is modified, in other architectures TCP RWND is adapted by proxying the connection and controlling it at the socket level. Moreover, the shaping rate requires RTT and Bandwidth estimation in order to compute the rwnd and replace the RWND field of all ACK packets headers by using the computed value of rwnd.

A method is provided to enforce an upper bound to the sending rate, based on the Bandwidth Delay Product (BDP) estimated in the controller entity. This is achieved by modifying the RWND of inflight acknowledgment packets. This methodology can be applied in a variety of ways. In one embodiment, an edge router can be considered as this controller entity in order to mitigate tail drop and avoid buffer bloat in intermediate routers, and a fair share of the edge router resources in terms of bandwidth: the router throttles in case they exceed a specific policy or the local resources of the router without the need to drop packets. In another embodiment more than one controller entity can be considered with connections end-to-end between them. In this case, in addition to using RWND to address fairness and bandwidth locally, RWND can be used to coordinate information between end-points in order to manage and policing bandwidth resources and even to coordinate any other information about the network or the policing system.

Described in detail below is a system and method for managing transmission over a network by adjusting a flow control window based on one or more parameters obtained from one or more connections, applications or network conditions. In one embodiment a controller modifies the receiver TCP advertised window of one or several connections to match the end-to-end bandwidth-delay product (BDP) for bandwidth fair sharing and improving the quality of experience (QoE). The controller can be placed in any given entity managing packets, such as a sender entity, a transmitting entity or any other entity handling connection packets. Also disclosed is a mechanism for estimating available path bandwidth and/or link capacity and location by analyzing the distribution of inter-packet arrival times. Packet pair dispersion analysis can be utilized based on passive evaluation of the acknowledgements of a TCP flow or based on active probing. Machine learning using a neural network can be used to analyze the distribution of inter-packet arrival times.

DETAILED DESCRIPTION

A communication support system based on an Automatic Communication Network Control (ACNC) method is provided with self-organized functionalities. Such a control method allows a communication network to range in scope from a pure self-organized network to a totally centralized network through partial self-organized networks. Self-organized functionalities are dynamically assigned to part or all the nodes that constitute the network to achieve the desired network behavior. In one embodiment, self-organized functionalities are used to reach an efficient sharing of the bandwidth resources of the whole communication network.

The aim of self-organized functionalities is to improve the automation of the communication network control to reduce network operator's overhead in the network process and enhance the network performance. In this system, a method is implemented to leverage the available bandwidth and improve the fairness and/or even fulfilling prioritization policies over the network traffic so that: (1) Global behavior convergence is achieved following self-organized network functionalities; (2) Coordination methods avoid conflicts and inconsistencies that are potentially involved; (3) State information is minimized; and (4) Nodes are capable of reacting to changes in the network. A series of mechanisms that constitute the building blocks to implement self-organization functionalities of an ACNC are presented in the description below.

A diverse terminology is used to refer to a node of an ACNC. In general such a node is a network device that can either act as a router, a proxy, a switch, or others, being it a hardware implementation, a software implementation or virtual network device. In the description below the terms "node", "router" and "actuator" are used generally to describe any such network device.

An architecture for an embodiment of one of the nodes composing the ACNC is presented in FIG. 1. A central component evaluates inputs coming from different sources of information and selects a control strategy for the network flows it handles according to an optimization strategy. Input sources could be heterogeneous, including active probing derived measurements, existing traffic monitoring measurements, and other components such as a traffic classifier, user-defined policies or the control feedback loop of some control actuators. Embodiments of such components are described in more detail below.

Network connections established can be configured in different manners. The configuration is understood as the set of connection parameters that modifies the connection behavior and/or responses to the network conditions. One of the most representative network conditions is the available bandwidth. Such a network system could auto-configure itself based on local rules that allow for resource allocation convergence. One embodiment for such a scope foresees modulation of the advertised receive window of a transport protocol such as TCP, another embodiment could tune the value advertised by the MAX_DATA or MAX_STREAM_DATA Frame of the QUIC protocol.

Receive Window Modulation is a mechanism to adjust the receive window advertised in the transport protocol header of the packets of one or a group of end-to-end connections traversing an intermediate node. This is intended to provide an upper bound to the sender window growth, effectively rate-limiting the connection throughput to a desired value. For example, such a boundary could be represented by the connection end-to-end bandwidth-delay product (BDP), computed from the connection round trip time and the path estimated available bandwidth. Another embodiment uses a different criteria to select the window value applied to a connection. For example, instead of using an estimated end-to-end available bandwidth, it could use the bandwidth available locally to the controlling node, dividing its local capacity between all connections traversing the node. Another embodiment could take into account both end-to-end available bandwidth, local resources, and other factors such as class policies.

RWM benefits include: (1) mitigating self-induced congestion generated by aggressive senders; (2) improving end-to-end connection throughput, latency, and fairness; (3) configurable class of traffic throttling and policing; (4) no modifications of the endpoints transport protocol stacks; and (5) transparency to the end-to-end connections end-points.

One embodiment of RWM does not require any modification of the TCP stack, as it is transparent to the end-points. A proxy does not need to terminate the connections, however a possible embodiment includes a proxy to achieve better control over the connections. RWM preserves the characteristics of the sender congestion control deployed as part of the end-point transport protocol and does not interfere with Active Queue Management strategies.

Another RWM embodiment modifies online the values advertised in the MAX_DATA or MAX_STREAM_DATA frames sent over an established QUIC connection. Such fields act similarly to the TCP receive window, limiting the amount of data a sender can transmit either on a per-flow or per-connection basis. In alternative embodiments, other forms of flow control window management used by other protocols can be used as a bandwidth control mechanism.

Some of the possible scenarios for RWM deployment include: (1) A single node implementing RWM modifying the explicit window control mechanism advertised in the protocol of the connections established through it; (2) Two nodes implementing RWM; and (3) Multiple nodes implementing RWM (being it a self-organized network such as ACNC, or not). All these scenarios have a common feature: the RWM controller adjusts the advertised window of the transport protocol of the packets traversing it. The RWM controller can be deployed everywhere in the network architecture (e.g. close to both sender and receiver). The RWM controller can adjust the advertised window without any modification of the underlying transport protocol stack. RWM preserves the characteristic of any sender congestion control deployed in the end-points.

Diverse parameters of the connection may be estimated, these parameters may or may not be considered for determining the modified window size. Usually, these parameters are the round trip time (RTT) and the available bandwidth of one or more connections. For instance, in TCP the receive window size may be calculated as a function of the RTT and bandwidth product. This is the product between the round trip time RTT and the bandwidth, the bandwidth-delay product (BDP).

Figure 2A:
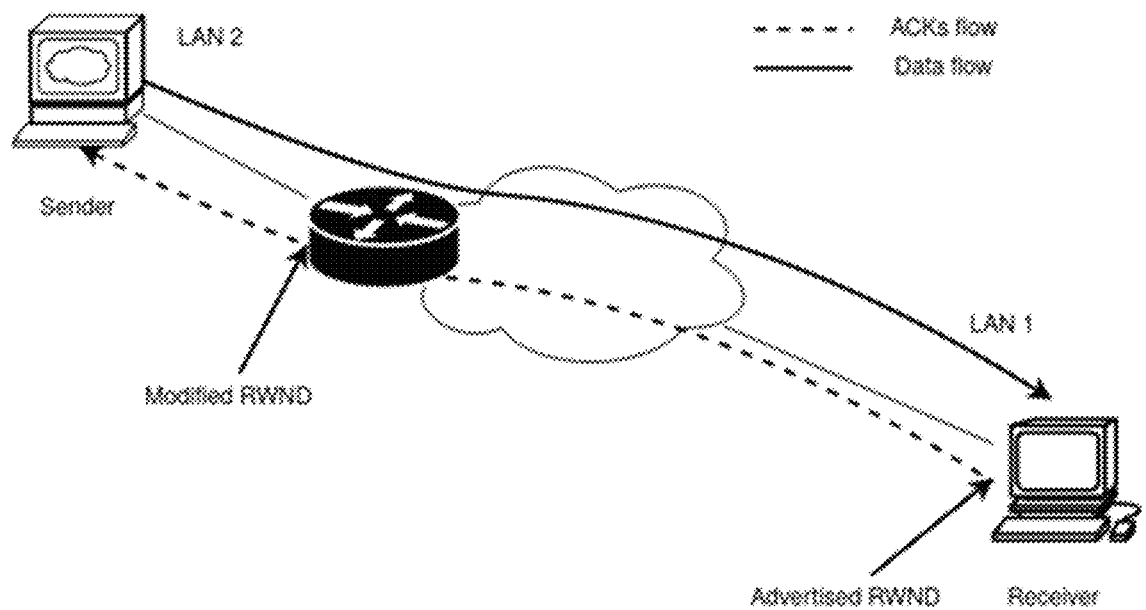
FIG. 2A illustrates a functional schema of receive window modulation (RWM)
Figure 2B:
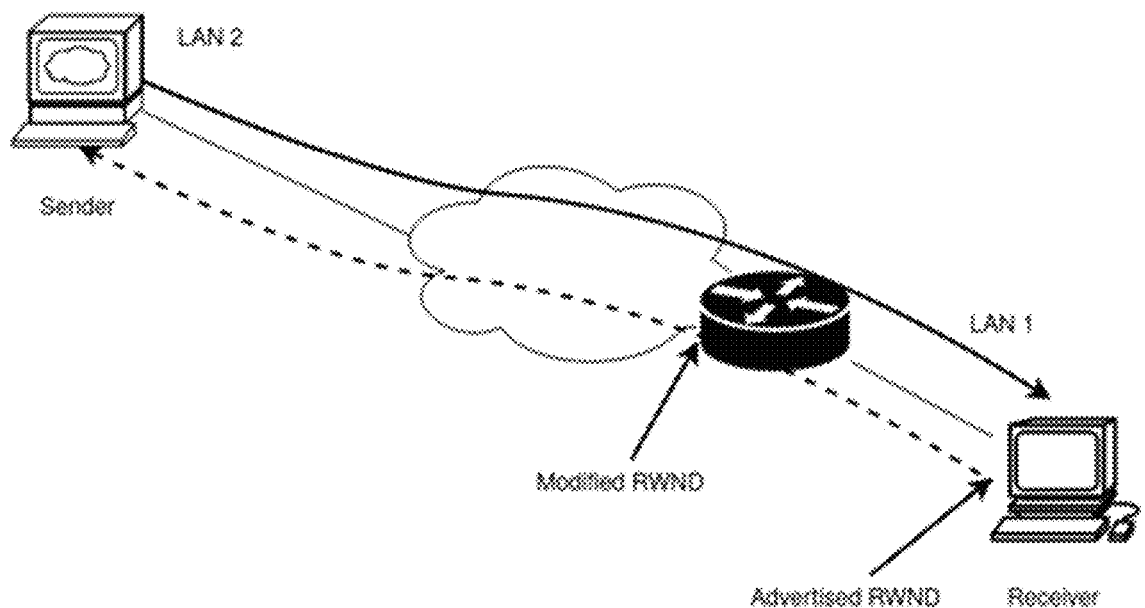
FIG. 2B illustrates another embodiment of a function schema of RWM.

The bundle of connections traversing a router can be heterogeneous in terms of the proximity of the end-points to the router. In FIGS. 2A and 2B two possible cases are presented. Considering separately each connection traversing the router, we can find that end-points involved in each particular connection can be placed near or far from the router location. Each of the routers is able to modify and throttle connections using RWM and modulate the window advertised in their transport protocol according to their local policies and estimations.

An RWM embodiment based on TCP could compute the window to assign to each flow managed by the controller according to the following relation:

$$\sum_j \left( \sum_i \frac{RWND_i}{RTT_i} \right) * P_j = C$$

where C is the capacity of the edge router link; $P_j$ is the allocation policy defined for a specific traffic class j, expressed as percentage of the access link capacity; and the subscript i refers to the i-th flow for the class j. The equation guarantees that the link capacity is distributed equally between flows of the same class and that each class is assigned the user defined share of network resources. In this case the control is based exclusively on the bandwidth available locally to the need and not on an end-to-end available bandwidth estimation. However, an embodiment envisions such available bandwidth estimation as an additional variable to compute the appropriate RWND.

A node implementing the RWM mechanism described in the equation above can be described by a procedural approach as the one defined in Algorithm 1:

Algorithm 1
RWM operation procedure NEW FLOW REGISTERED
  C ← access_link_capacity
  for c in traffic_classes do
    $P_c$ ← class_policy
    $C_c$ ← C · $P_c$
    for f in flow_table_c do
      if W $SCALE_f$ not recorded then
        skip to next flow
      end if
      $RTT_f$ ← estimated_flow_rtt
      $BDP_f$ ← ($C_c$ · $RTT_f$) /len(flow_$table_c$)

Algorithm 1
RWM operation

Figure 3A:
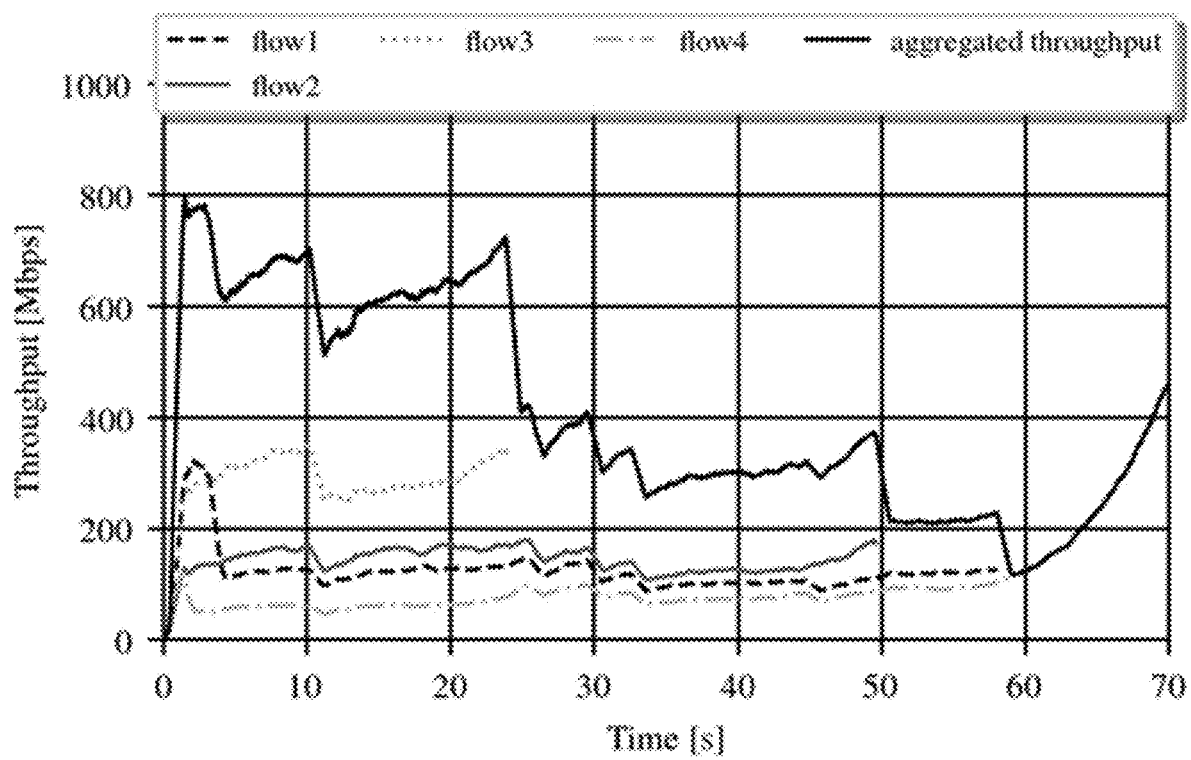
FIG. 3A illustrates throughput for a group of four simultaneous CUBIC TCP flows without any controller.
Figure 3B:
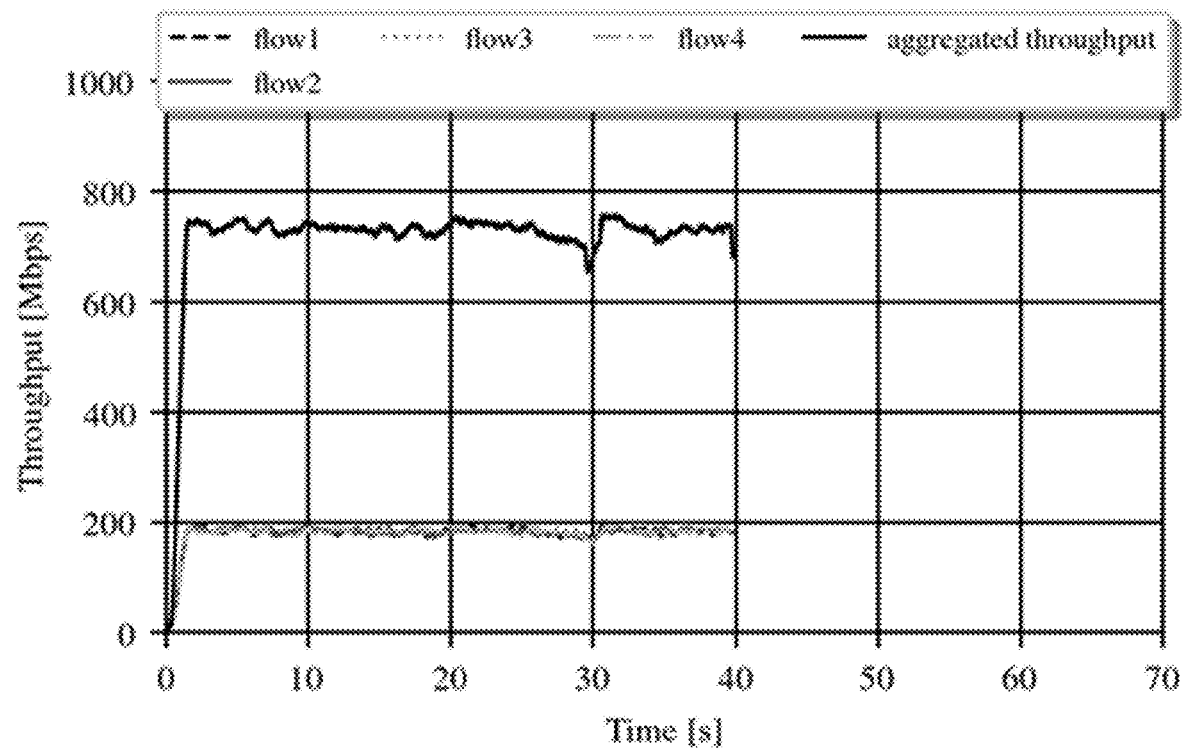
FIG. 3B illustrates throughput for a group of four simultaneous CUBIC TCP flows using the RWM controller.

RW $ND_{BDP_f}$ ← $BDP_f/2^{W\ SCALE_f}$
      RW $ND_f$ ← min(RW $ND_f$, RW $ND_{BDP_f}$)
    end for
  end for
end procedure The results of a test of a real RWM implementation acting on the TCP receive window are shown in FIGS. 3A and 3B. Non-controlled experiments using the CUBIC TCP congestion control in the endpoints are compared to the same type of flow controlled by an RWM controller deployed close to the edge router close to the receiver, in a scenario similar to the one of FIG. 2B. The access link capacity is 1 Gbps. Four TCP flows transferring 1 GB worth of data start simultaneously between the same two endpoints; the RTT of the connections is around 60 ms. FIG. 3A shows the throughput of the four connections having a very varied behavior with inconsistent performance. The aggregate throughput reaches a high peak link utilization at the beginning of the test, but the long term utilization is way below the link capacity once the first flow terminates; the link capacity is not shared fairly between the competing flows: one of them is greedier and finishes faster, penalizing the congestion windows of the other three flows. The final Flow Completion Time (FCT) for the set is around 70 seconds. In FIG. 3B the throughput for the test performed using the RWM controller is shown. The throughput is consistent along the entire duration of the data transfer and the congestion windows always work above the level of the receive windows being enforced. The four flows reach fair sharing of the link capacity and all finish at the same time, taking around 40 seconds. Almost full link utilization is reached during the full duration of the test.

Figure 4A:
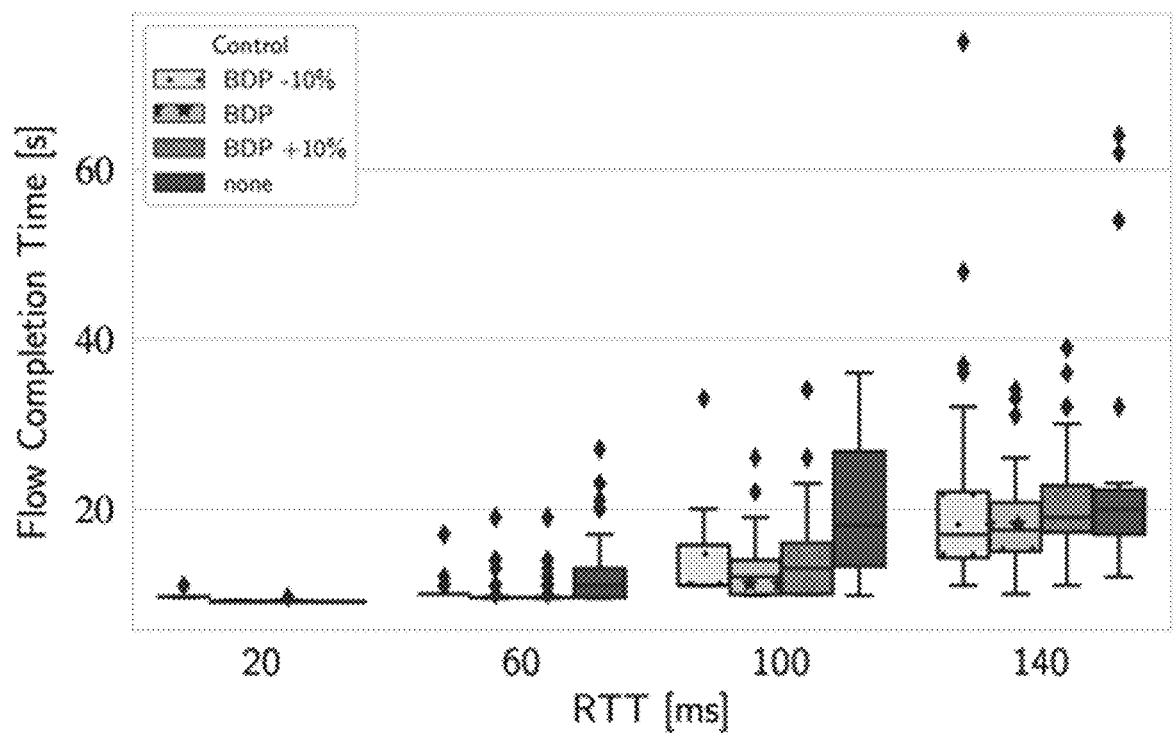
FIG. 4A illustrates flow completion time for one TCP flow transmitting 1 GB worth of data, with the RWM controller modulating the advertised window to different BDP values or without any control, for different RTT values.
Figure 4B:
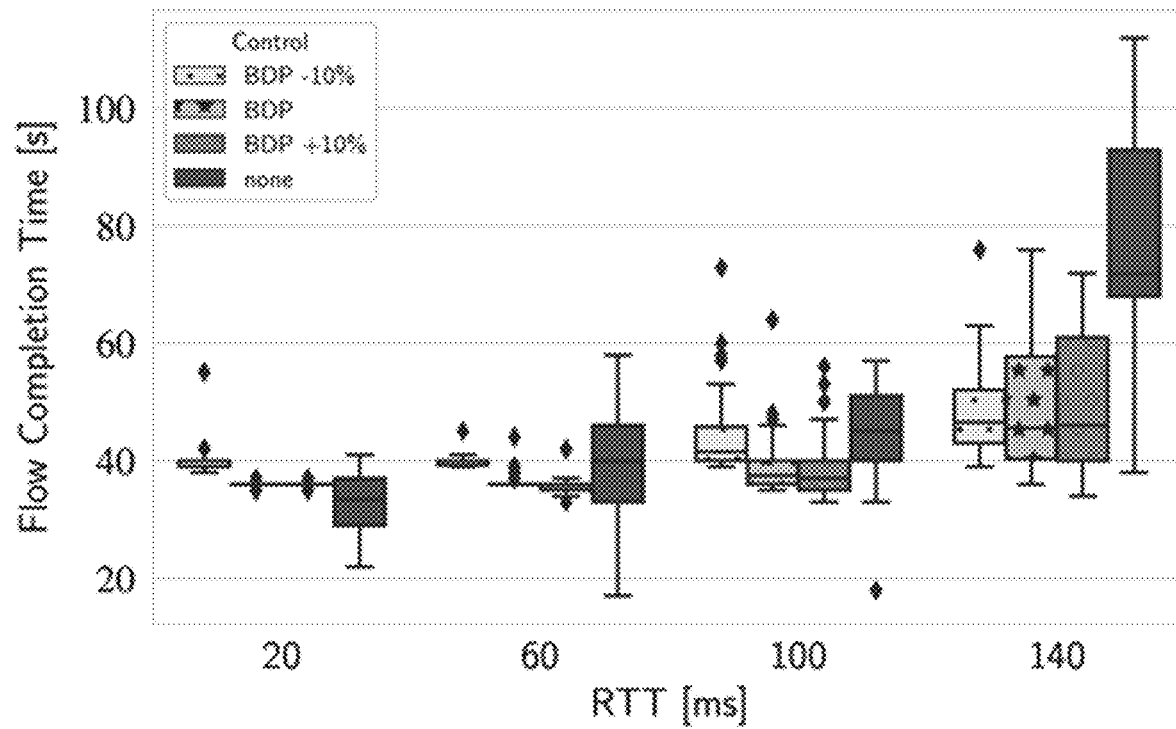
FIG. 4B illustrates flow completion time for four simultaneous TCP flows transmitting 1 GB worth of data, with the RWM controller modulating the advertised window to different BDP values or without any control, for different RTT values.

FIGS. 4A and 4B show the aggregate results of an extensive testing performed on a TCP-based RWM implementation. The tests performed are the same described previously in connection with FIGS. 3A and 3B but multiple scenarios are generated by modifying the RTT, ranging from 20 ms up to 140 ms. The results are presented in the form of boxplots. Each category on the x axis represents all the tests executed for that specific latency value. On the y axis is the distribution of the FCT of all the tests performed in that specific latency for a specific type of control. The RWM control can modulate the window at the actual path nominal BDP value, at the BDP value +10%, at the BDP value −10%, or finally without any RWM control.

FIG. 4A shows the results as described, in the case of one single TCP flow connection transferring data between the same two endpoints. We can observe that the range for the non-controlled scenario has considerable variability. The controller improves the behavior of the flows by keeping a more consistent rate during the whole transfer. While improvement is clear for the 60 ms and 100 ms scenarios, we can see that for 140 ms the margin is reduced. Results suggest that, when increasing the RTT, and thus the BDP, the amount of in-flight data injected by the sender is enough to fill one or multiple queues along the path. This holds true even when controlling the receive window to match the nominal BDP. As a matter of fact we start measuring tail drop in our own router buffer.

On the other hand, we can see from FIG. 4B that when adding multiple traffic sources the aggressiveness of the congestion control algorithm at the sender is enough to incur in a consistent performance penalty even at lower latencies. At 140 ms of RTT it is possible to observe that the 50th percentile for the FCT of the uncontrolled scenario is almost 1.5 times higher than the controlled scenario. The difference between the different levels of control applied is marginal with a clear trend: an underestimation of the BDP of 10% brings less variability but average higher values for FCT, while the best results are obtained when controlling at the ideal BDP point; overestimation shows lower 25th percentile values for higher RTT values, but brings more variability to the overall statistic. In this representation each data transfer counts as an independent event. We computed the distance between the 50th percentiles of the different categories: RWM improvement in terms of FCT in the one transfer scenario is up to 46%, while in the four transfer scenario the improvement goes up to 70%. Another relevant observation relates to the 140 ms category in the scenario of FIG. 4B: the 75th percentile of any of the controlled tests is better than the 25th percentile of the non-controlled case.

Figure 5:
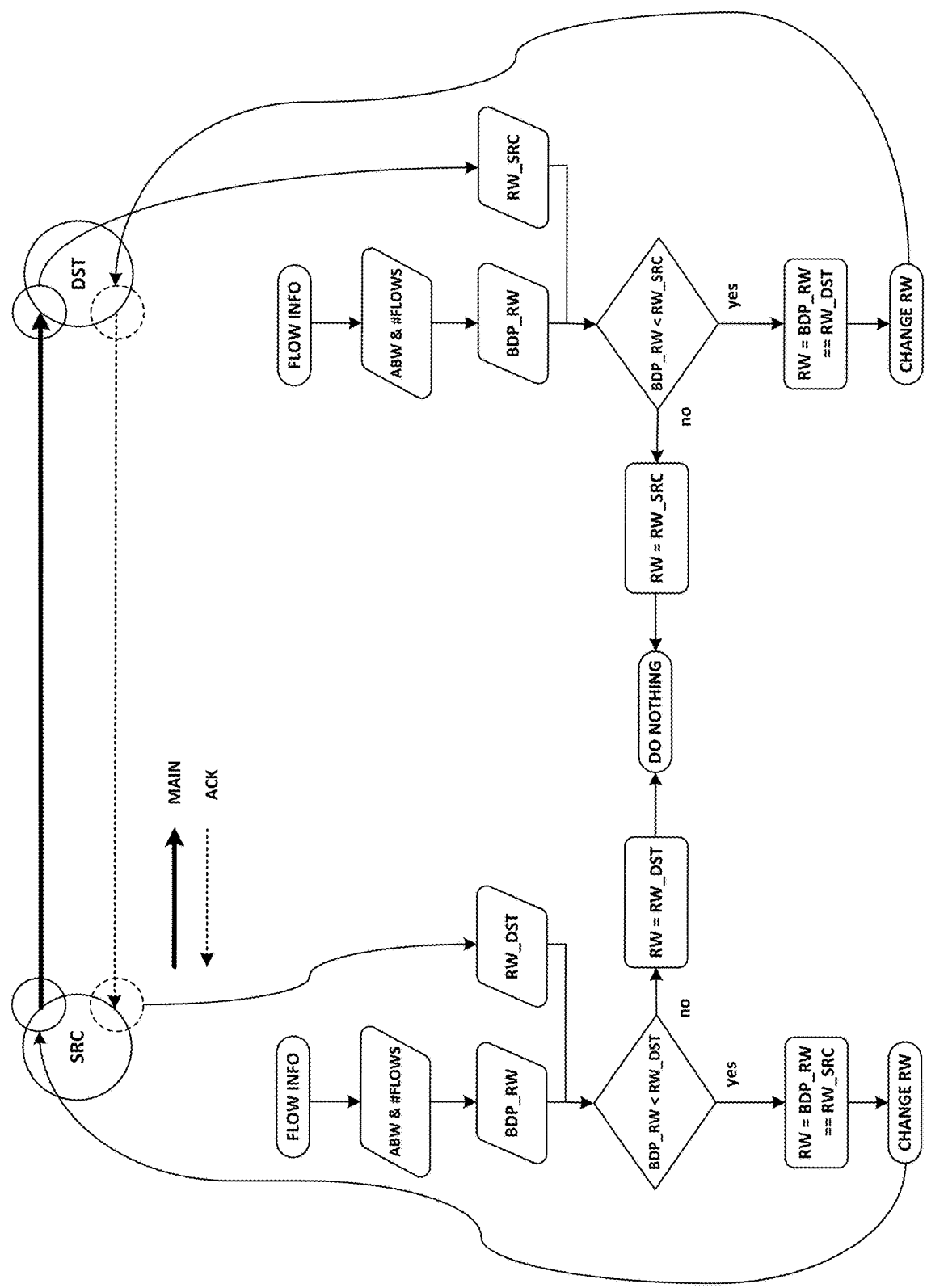
FIG. 5 illustrates an interaction scheme when two devices acting over the same connection implement RWM.

FIG. 5 illustrates a scenario where the RWM controller is deployed in two different actuators, one close to the connection source and the other close to the destination. The actuators could be edge routers, the endpoints themselves, or any other intermediate entity or network node. In an embodiment, each actuator puts in place an evaluation strategy to estimate the end-to-end BDP of each flow traversing it. According to the number of flows, the node bandwidth capacity and the estimated BDP, the controller modifies the window advertised by each flow to control the sending rate to an optimal value. Such information is embedded in each packet transport protocol header and propagated to any other node that can interpret it. In the case of FIG. 5 for example, an RWM controller close to the receiver (DST) modifies the TCP receive window of the ACK packets of a specific flow to control the sender rate accordingly. When packets arrive close to the sender in another RWM controller (SRC), such a controller evaluates the current receive window value. If its local resources or estimations derive a lower BDP value for the specific flow than the one advertised in the protocol window, the controller can modify again the advertised receive window to match the optimal sending rate computed. This type of interaction defines a coordination mechanism that allows multiple nodes to perform flow rate control according to their local policies and global vision obtained with their estimations without breaking the transport protocol semantics and avoiding control decision collisions.

Another embodiment envisions a system that dynamically and selectively implements self-organized functionalities ranging in scope from a pure self-organized network to a totally centralized network through partial self-organized networks. The network behavior can be modulated to achieve the desired behavior by means of constraints (policies). These constraints may affect, for example, the available bandwidth assigned to a set of connections sent toward a specific end-point or the selection of the path through the internet that a set of connections should traverse. There are two main blocks of information that can be used to derive constraints: (1) Traffic information, including: users behavior characterization, users demand, and anomaly detection between others; and (2) Network information which can be used to determine properties of the paths that connections follow to reach their destination, or describe the network in terms of latencies, losses, capacity, available bandwidth, and bottlenecks.

Control of the self-organized network can be carried out from the constraints based on traffic information and/or the state of the network. For example, traffic information such as traffic demand could impose constraints on bandwidth utilization as well as information on user behavior could prioritize the distribution of bandwidth among users. Regarding the information that defines the state of the network, it has various uses to formulate constraints that allow a desired control of the self-organized network.

The Smallest Links Capacity Set (SLCS) is defined as the subset of all the links of an end-to-end path that constitutes a narrow link in at least one of the sub-segment of the path that include the source of the probes. In some cases, information on paths such as SLCS, the quality of the network in terms of packet loss, latency variability, and the position of the narrow link can be used to make decisions about the use of network resources. For example, if an endpoint has more than one ISP, the network information could show differences in the quality of the network between different providers. In this case, the most suitable provider could be dynamically selected to establish connections to the desired destination depending on the quality of the network and even on the type of application associated with each connection. In another case, there are two endpoints that establish persistent connections between them (e.g. for a VPN) that can be used as tunnels. The network information that runs through the tunnels could be used to selectively and dynamically tunnel the connections established between the endpoints. Such a selection could be carried out by type of application or user, allowing in the latter case to mix the traffic information with that of the network to make constraints.

Controlling a self-organizing network using these so-called constraints is consistent with the principles of a self-organizing system of scale, since constraints are applied as local rules in each entity, even though it concerns more than one entity. Although the system evolves into a controlled state under the desired conditions, one may want to generate heuristic models that coordinate the execution of such and more constraints so that the use of the self-organized network reaches the desired optimal use. As the number of entities in the self-organizing network increases, as well as the number of constraints, the problem combination grows extremely fast, which is one of the problems in the family of combinatorial optimization problems. We can solve this problem using quantum computing (e.g. quantum annealing). Hybrid combinations of quantum computing and classical computing can be used to find solutions and Machine Learning (ML) techniques are used to boost the relationship between self-organized network scenarios and the optimization obtained by quantum computing. This is, once a set of optimal solutions are obtained from quantum computing, ML techniques learn a mapping between the self-organized scenarios and the solutions provided by the quantum computing in order to avoid using too many quantum computing resources.

Figure 7:
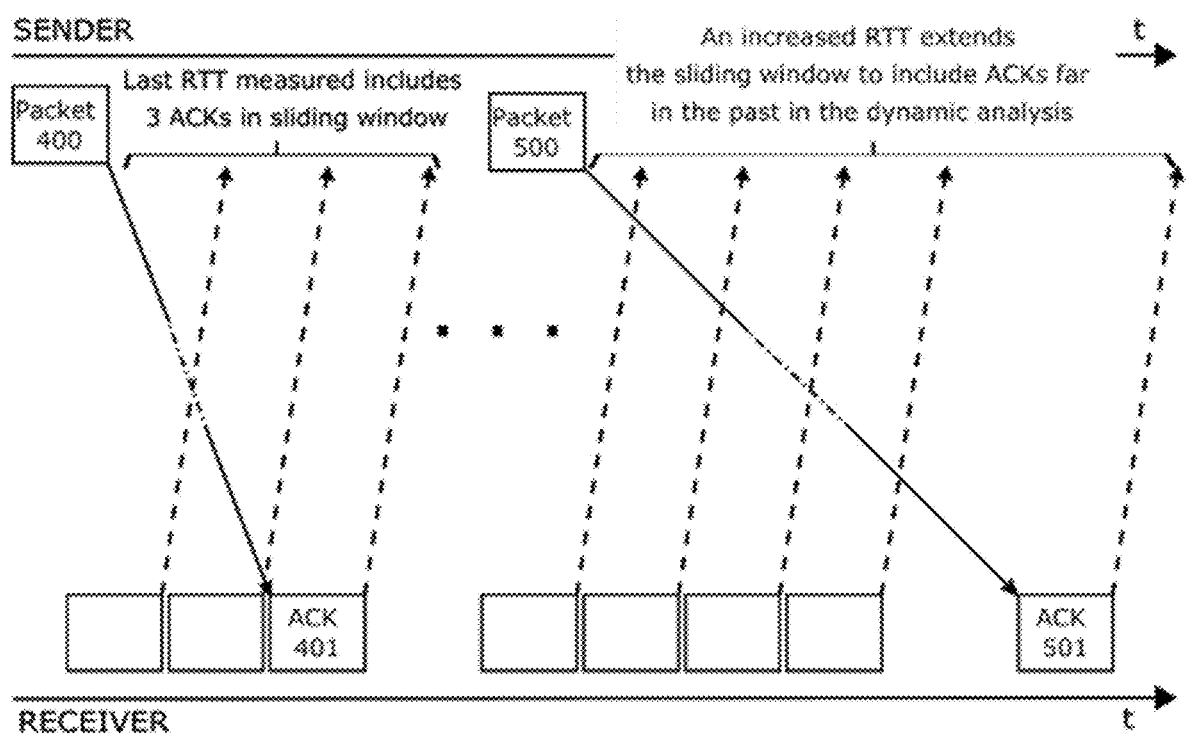
FIG. 7 illustrates available bandwidth estimation using a dynamic sliding window mechanism.
Figure 8:
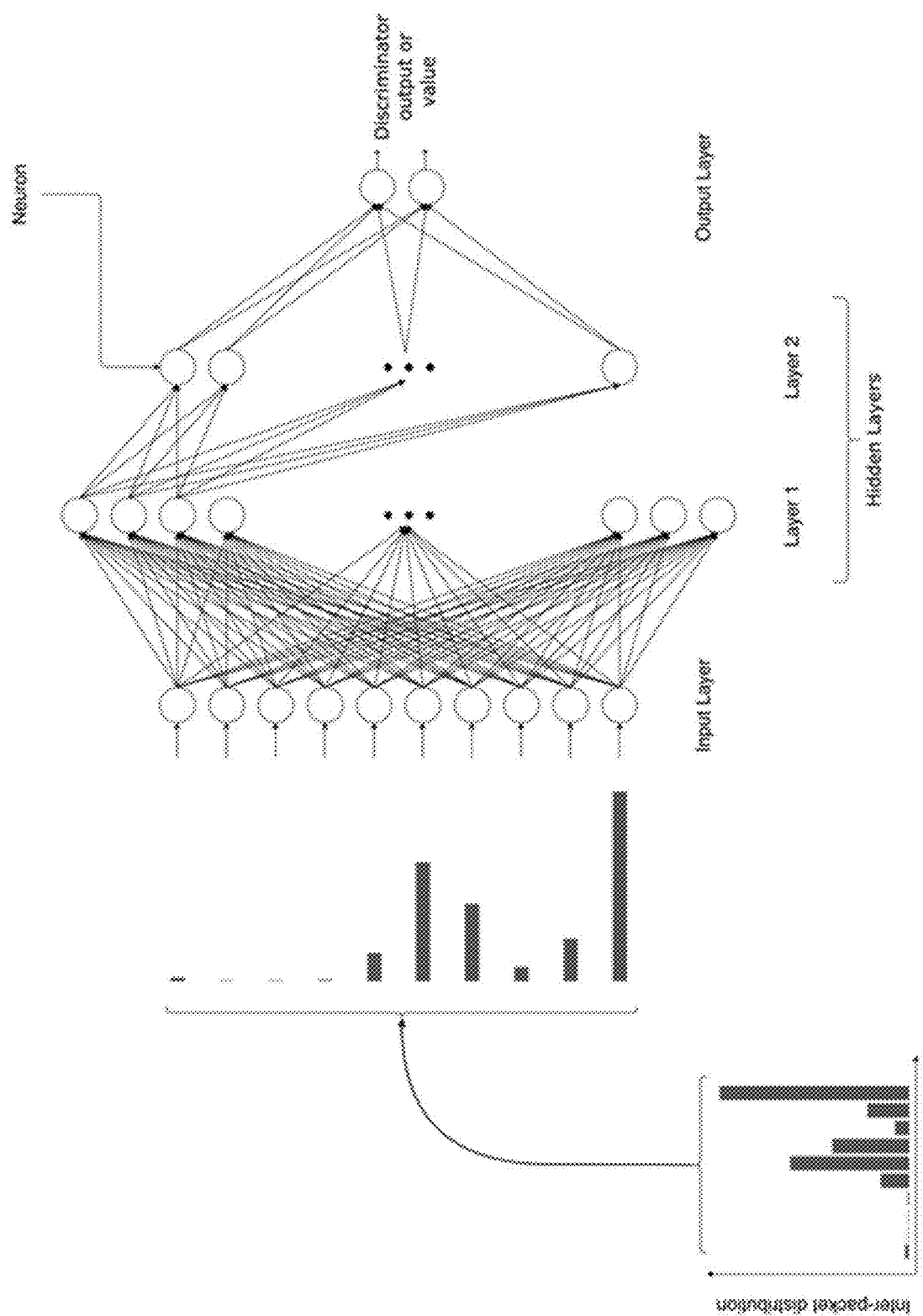
FIG. 8 illustrates a Deep Neural Network implementing a classification algorithm for inter-packet distribution classification and available bandwidth estimation.

A component of the system that is able to provide additional information to a flow controller is an available bandwidth estimator. Such a component could take advantage of existing traffic measurements to estimate the end-to-end available bandwidth for a specific connection. A possible embodiment of such a controller computes the inter-packet arrival time of a series of packets sent back-to-back. A dynamic mechanism to compute the inter-packet arrival statistic can be implemented. In FIG. 7 a specific embodiment of such a mechanism takes advantage of an acknowledgments based protocol to dynamically select the number of packets to take into account to build the inter-packet arrival statistic according to the last measured RTT. After the packets are selected, another module extracts the available bandwidth value. Such a module detects shapes in the inter-packet distribution to compute its value. One of its possible implementations takes advantage of a deep neural network to discriminate relevant distribution shapes and/or estimate the available bandwidth itself as shown in FIG. 8.

An embodiment of such an available bandwidth estimator could consist in a passive probing method based on the study of the inter-packet arrival time of TCP acknowledgments. In alternative embodiments the acknowledge packets of other transport protocols could be used. The main characteristics of this approach are: (1) it is computationally inexpensive and therefore suited to real time analysis; (2) it does not need to be deployed at both endpoints of a connection to measure the available bandwidth; and (3) no assumptions about the cross-traffic model are made.

Possible applications of such an estimator include active congestion control strategies e.g., active queue management at an edge router or congestion control at the endpoint, and available bandwidth analysis. The terms narrow link and tight link will be used to reference, respectively, the link on an end-to-end path with the lowest capacity and the link on path with the lowest available bandwidth.

Figure 6:
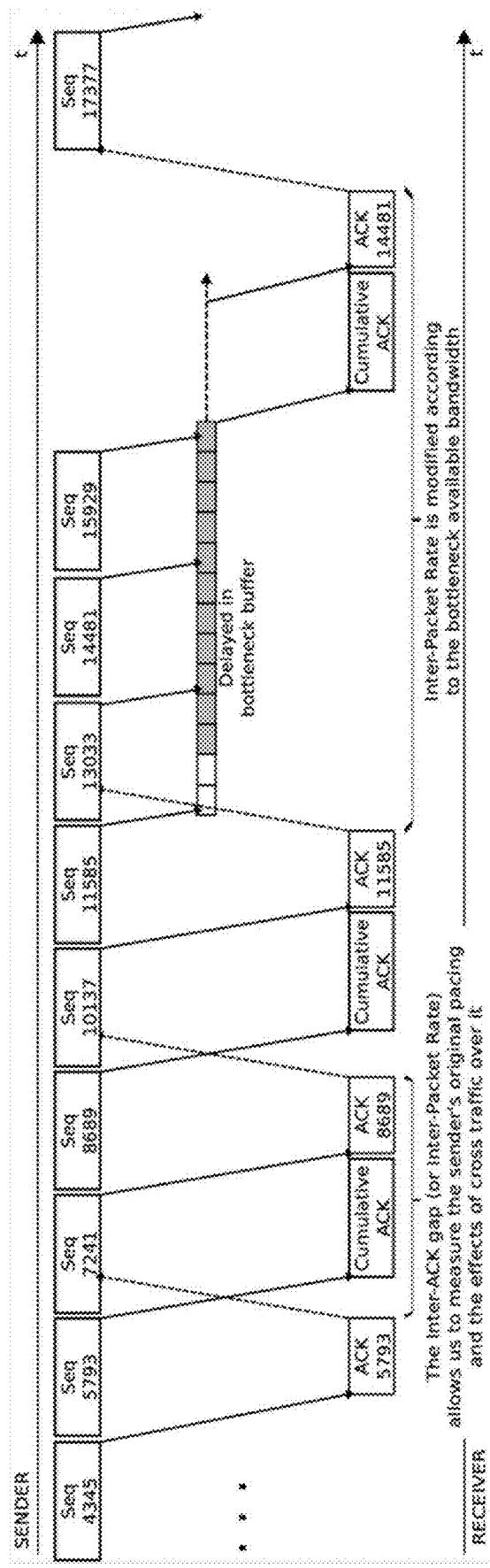
FIG. 6 illustrates inter-packet rate of a TCP flow computed based on the acknowledgments rate and the size of the ACK originating packets.

The basic measurement on which an available bandwidth estimator could be based on, is the inter-packet arrival time of the acknowledgments of a TCP flow while using the size of the packets originally generating those ACKs to compute the rate. An example is shown in FIG. 6.

An available bandwidth estimator based on TCP acknowledgments analysis could be structured in two phases: in the first phase the component estimates the narrow link capacity based on the inter-packet ACK distributions of the first packets of a TCP connection, which are usually sent back-to-back; to determine the appropriate number of packets a to consider to compute the capacity in this first phase a possible formula is:

$$\alpha = \frac{C_n}{2 \cdot MSS \cdot RTT} \cdot \epsilon$$

where $C_n$ is the network card capacity and $\epsilon$ is an experimentally determined constant. In a second phase, the estimator could use a heuristic or any other type of algorithm to continuously evaluate the bandwidth available on the TCP connection path. A simple way to estimate the narrow link capacity based on the first packets of a TCP flow is by studying the ACKs inter-packet rate distribution dispersion. A minimum number of packets has to be taken into account to build such statistics and it can vary according to the link capacity, the TCP slow start algorithm, the connection RTT and the amount of cross traffic in the tight link. Studying the modes of such a distribution enables the discovery of the path narrow link.

A similar technique can be applied to evaluate the connection path available bandwidth. For example, by using the dynamic mechanism shown in FIG. 7, the estimator can build a live histogram of the ACKs inter-packet rate. A strategy to obtain the available bandwidth from such a distribution could be to look for a significant dispersion for its inter-quartile range, while its mean value approximates the median value of the distribution. When such a criteria is met, the mean value of the distribution could be used as available bandwidth estimation. To refine the measurement obtained from such a strategy, a machine learning algorithm could be used to discriminate valid estimations from misleading ones. In another embodiment such an algorithm could directly provide the available bandwidth value. One of the possible machine learning approaches to such a problem foresees the usage of Deep Neural Network such as the one shown in FIG. 8.

Figure 9A:
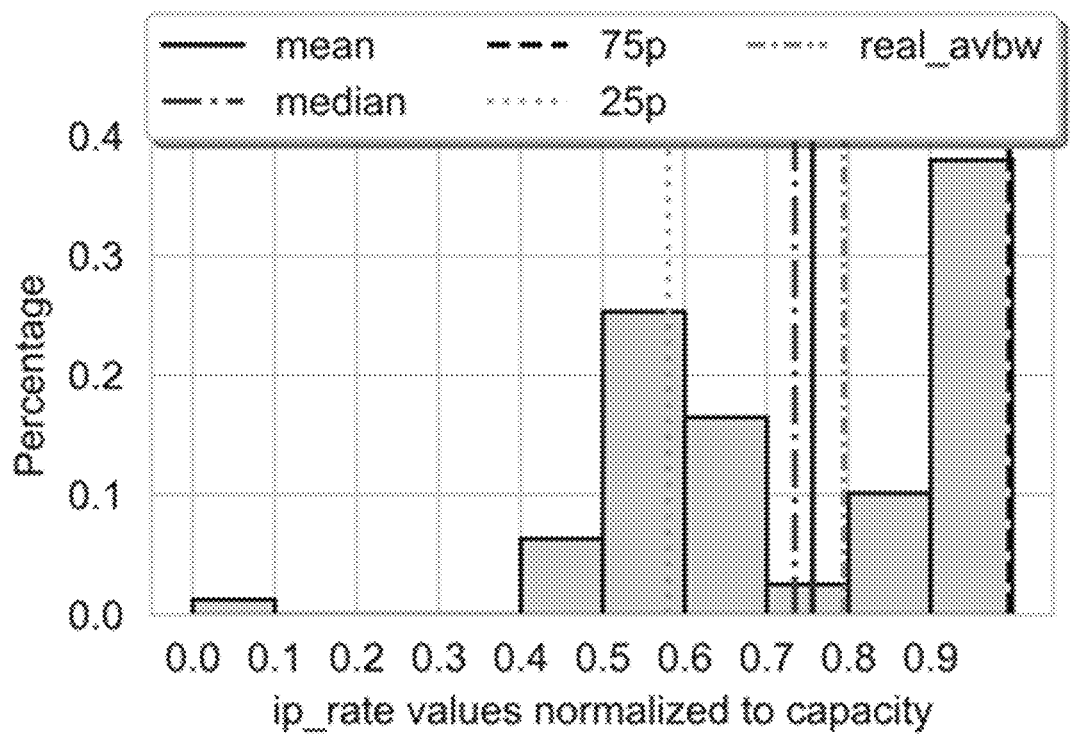
FIG. 9A illustrates a well-shaped distribution for the inter-packet rate measured in a time interval by an available bandwidth estimator.
Figure 9B:
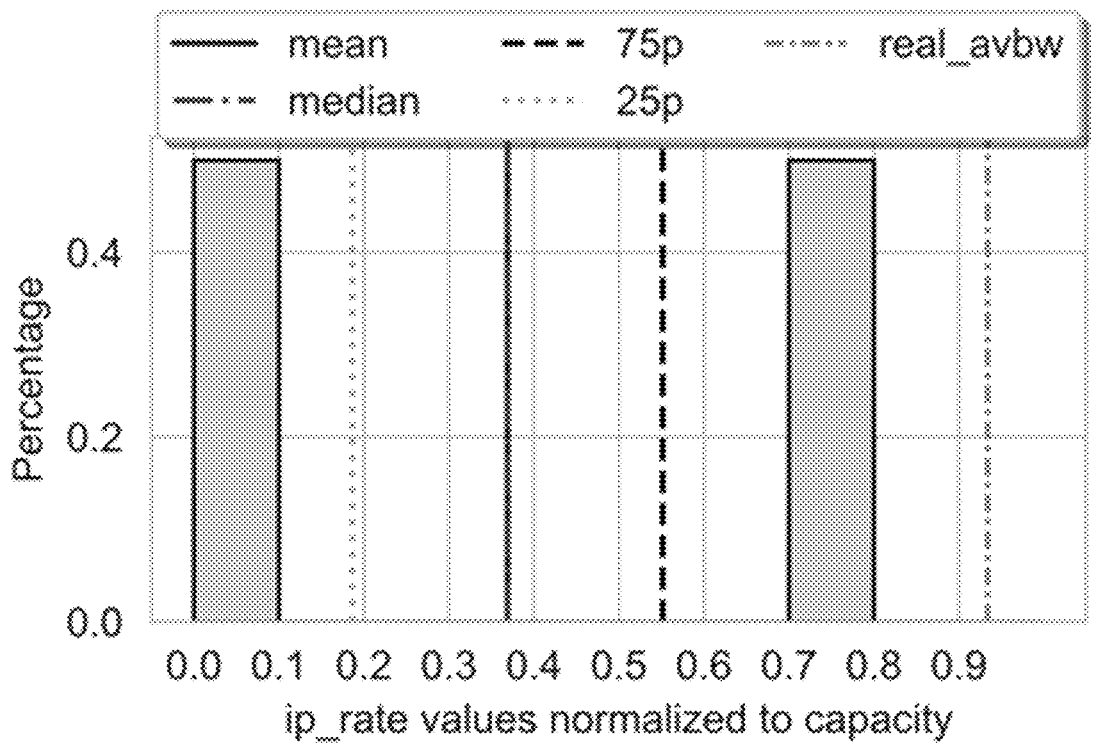
FIG. 9B illustrates a distribution for the inter-packet rate measured in a time interval by an available bandwidth estimator in which little valuable information can be derived.

In FIGS. 9A and 9B, two inter-packet rate distributions derived with the method described above are shown. In FIG. 9A it is possible to detect a valid pattern to compute the available bandwidth, while 9B does not provide significant relevant information on the current network status. A machine learning discriminator using a Deep Neural Network such as the one described in FIG. 8, is able to distinguish well-shaped distributions which can be used for available bandwidth estimation.

Another version of the estimator described previously uses a different heuristic approach to detect available bandwidth. The intervals for the estimation are selected based on the gradient modification of the exponentially weighted moving average (ewma) of the inter-packet rate distribution. For example, when the ewma gradient slope is negative and a lower percentile of the distribution is close to zero, we could be detecting a moment in which the flow in analysis is being buffered in an intermediate queue. When this happens, the subsequent packet pair rate will be representative of the available bandwidth as they will be served by the bottleneck queue at its available bandwidth rate.

Such an available bandwidth estimator would be computationally inexpensive, taking advantage of simple statistical analysis of TCP traffic. It could be deployed just on one side of the TCP connection, being it either close to the sender or the receiver. Such an estimator implements a heuristic that detects inter-packet rate distributions whose mean value approximates the network available bandwidth. A possible improvement to the heuristic consists in detecting patterns in the distributions that could be learned by an Artificial Neural Network. The ANN acts as a discriminator of histograms that are better suited for the estimation or by directly computing the available bandwidth value. Such an estimator is a good candidate to be part of a TCP congestion control algorithm or other types of traffic control systems such as RWM.

Figure 10A:
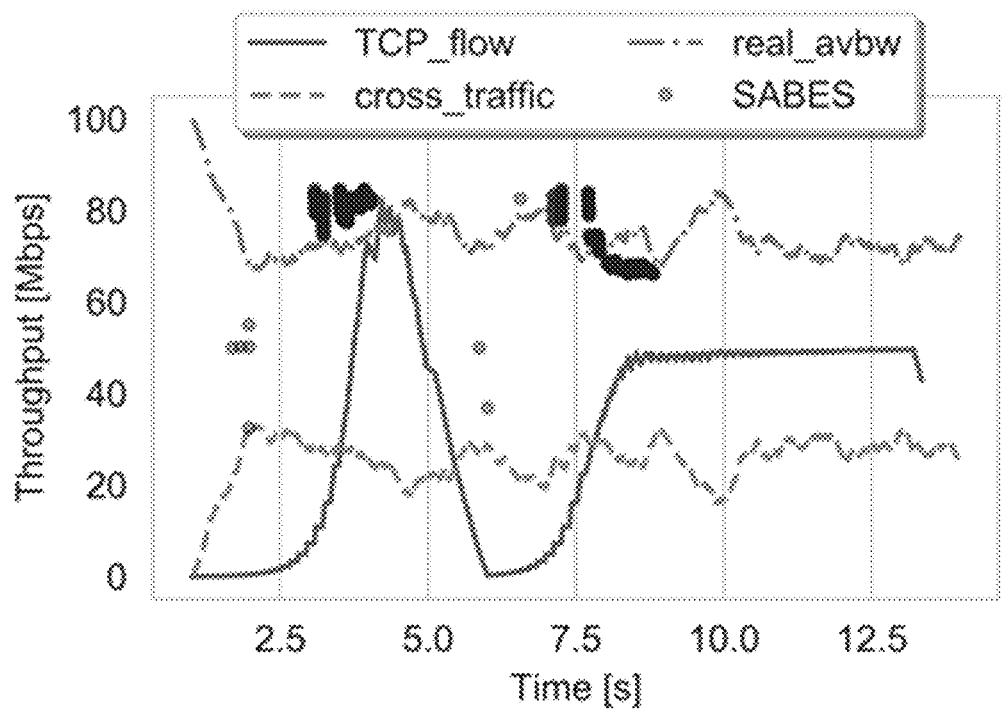
FIGS. 10A and 10B illustrate available bandwidth estimators in embodiments of the invention (dots representing estimations obtained) showing the mean absolute error of all the estimations to be less than 7% of the link capacity.

Qualitative results for an available bandwidth estimator implementation called SABES are shown in FIG. 10A. SABES is one of the possible implementations of the method described above. The results shown are derived from the statistics elaborated in real time for a single TCP flow competing with 20% Pareto cross-traffic in a simulated scenario with a narrow link capacity of 100 Mbps. Dots represent SABES estimations. The estimator provides correct estimations based purely on acknowledgments-derived measurements. In this scenario the loss-based TCP congestion control is never converging to an optimal link utilization. As a matter of fact, this flow TCP throughput diverges from the real available bandwidth with an error of 30 Mbps in its congestion avoidance phase. On the other hand SABES is able to detect when the inter-packet rate measurement is representative of the available bandwidth and the mean absolute error of the estimation set is 7 Mbps.

Figure 10B:
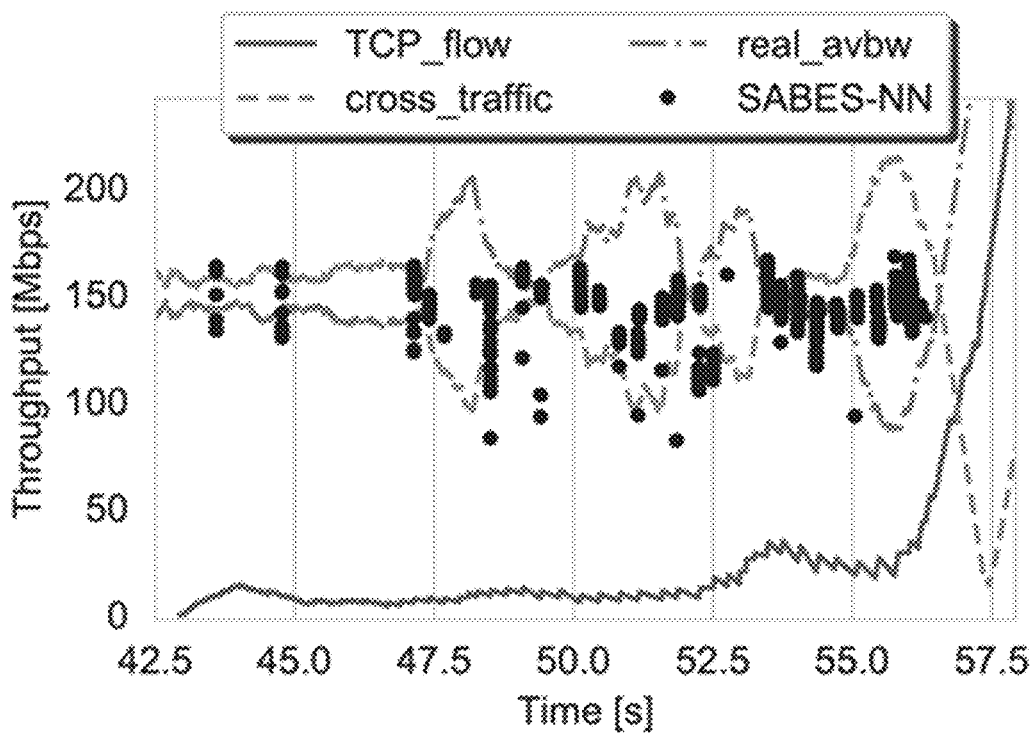

The estimator implementation described above in connection with FIG. 10A can be enhanced by applying a neural network as describe above. This new approach is referred to as SABES-NN. In FIG. 10B, the results of SABES-NN estimations are shown for a single test. The test consists of three concurrent HTTP/TCP file transfers of 100 MB competing for a bottleneck link of 300 Mbps with one UDP cross-traffic flow following a random Pareto distribution. The throughput of only one of the three TCP flows is shown. SABES-NN effectively detects moments where it is possible to infer the real available bandwidth, even though the flow throughput is far lower. The mean absolute error of the estimation set is less than 10% of the bottleneck capacity.

FIGS. 11A and 11B show the mean absolute error distributions of SABES over a big experimental validation dataset consisting of thousands of simulations with different conditions in cross traffic variability and end-to-end latency. In FIG. 11A a purely heuristic approach is used to estimate the available bandwidth, while in FIG. 11B a machine learning enhanced version provides more accurate results. The boxplots show the improved accuracy provided by the usage of the neural network. The 50th percentile of the estimations of FIG. 11B error is below 10 Mbps in all the scenarios proposed, compared to the 30 Mbps obtained when using the heuristic alone in FIG. 11A. While training a neural network is computationally expensive, its execution is quite inexpensive. We quantify that adding the neural network evaluation increases the computation execution time by less than 6% in respect to the heuristic alone.

Another component providing information to a flow controller is a module that estimates the end-to-end maximum capacity and its position; it can also provide additional information on the capacity of the intermediate links. For example, such a component could provide the capacity values of what is defined as the Smallest Links Capacity Set (SLCS): the subset of all the links of an end-to-end path that constitutes a narrow link in at least one of the sub-segment of the path that include the source of the probes. FIG. 12 shows an example of SLCS in a network path. In this case, the circled node capacities constitute the SLCS (01, 02, 03). An embodiment of such a module could be an active-probing generator using packet pair dispersion analysis to evaluate the SLCS.

Packet pair technique is an active probing technique that utilizes sending, end-to-end from source to sink, two packets of a given size Z in a certain time interval. The dispersion of a packet pair $\tau_p$ is a metric computed at a certain path point, and is understood as the time interval from the instant the last bit of the first packet is received to the instant the last bit of the second packet is received. The one way delay transit time (owdtt) is a metric obtained by timestamping a specific packet at the sender and comparing then the timestamp with the timestamp generated at the receiver. Clock synchronization between the sender and the receiver nodes is important for the precision of owdtt, but is not a strict requirement for this technique, while the difference in the clocks is a constant offset.

In an end-to-end context, we can only get measures on the sender and the sink end points. When a packet pair reaches the sink, it is possible to compute the owdtt of each packet: owdtt1 for the first packet received, and owdtt2 for the second packet. We can apply the relation owdtt=owdtt1+owdtt2, where the delay $D_i$ at each hop i, is given by: $D_i = D_{det,i} + D_{sto,i}$, where $D_{det,i}$ is the deterministic delay and $D_{sto,i}$ is the stochastic delay at each hop. Contributing to $D_{det,i}$ are: the total propagation delay along the physical links in the path and the transmission time for hop i, which is the time it takes to copy the packet into the buffer as well as serialize it over the communication links; the processing delay at hop i which is the time needed to process an incoming packet or the time needed to prepare a packet for further transmissions. Contributing to $D_{sto,i}$ is the queueing delay in hop i. This is referred to the waiting time in buffers and is related to traffic characteristics, link conditions or even node implementations. It is then possible to compute the packet pair dispersion (Ppd) from which it is possible to obtain a bandwidth estimation as $bw_p = Z/\tau_p$. By repeating several times the experiment it is possible to obtain a set of triplets (bw, owdtt1 and owdtt2) making up different distributions.

Packet Pair Dispersion is based on the analysis of the bw distributions. For this, we take into account both bw and owdtt distributions. Our approach extends packet pair dispersion to a new concept comprising the main aspects of the packet pair technique phenomena. This is, every time a pair of packets is sent, in the context of end-to-end path, it can be affected by cross traffic (stochastic delay $D_{sto}$) and/or by limitations of a link capacity (deterministic delay $D_{det}$). Both cases only can increase the delay of both or one packet of the packet pair technique, modifying at the same time the inter-packet time. Therefore, three values describe this phenomena at the receiver end-point: owdtt1, owdtt2, and the inter-packet, which is equivalent to the bw considering the packet size.

Figure 13:
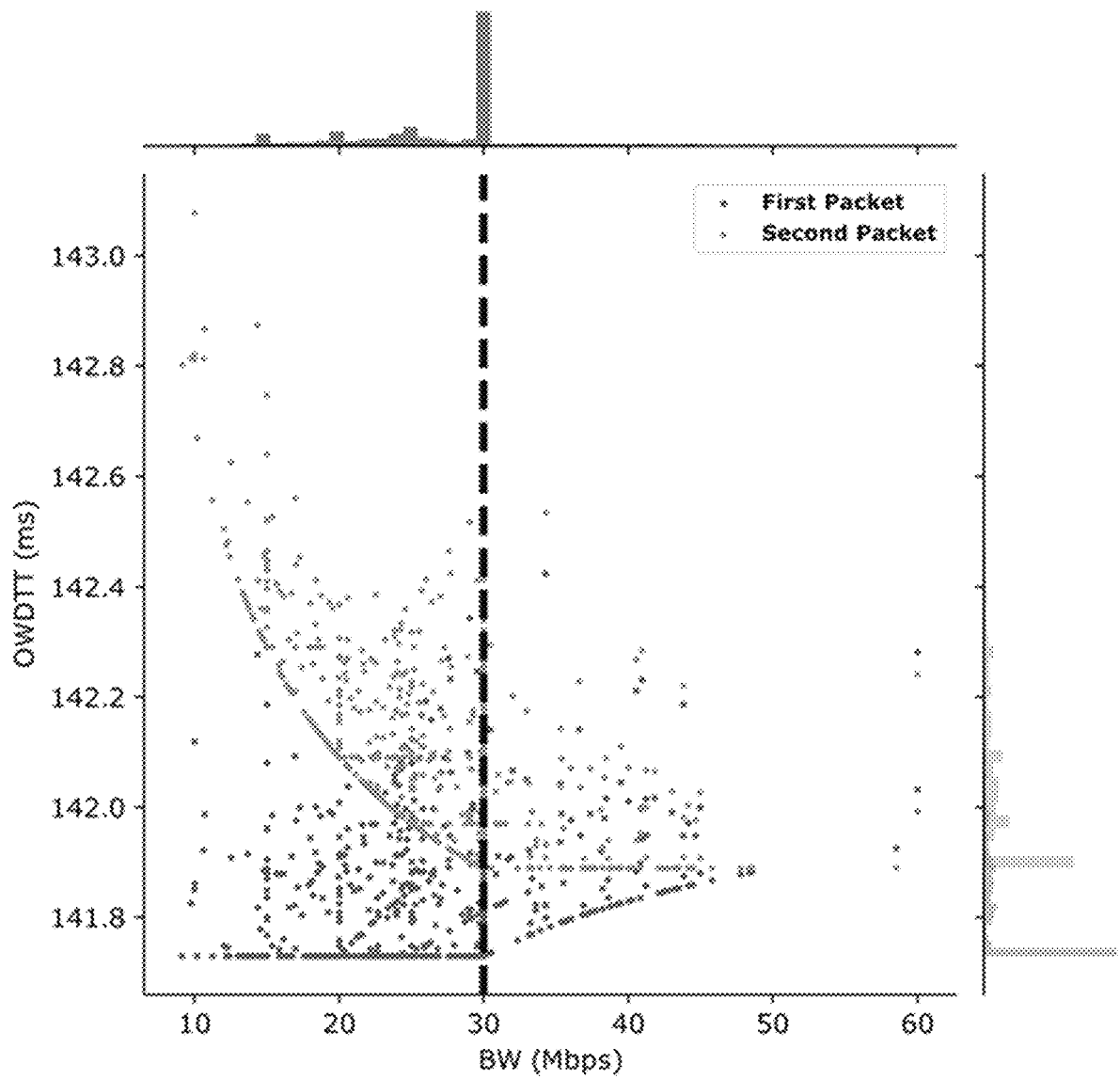
FIG. 13 illustrates a multidimensional analysis of packet pairs dispersion and the one-way delay of each of the pair packets.
Figure 14:
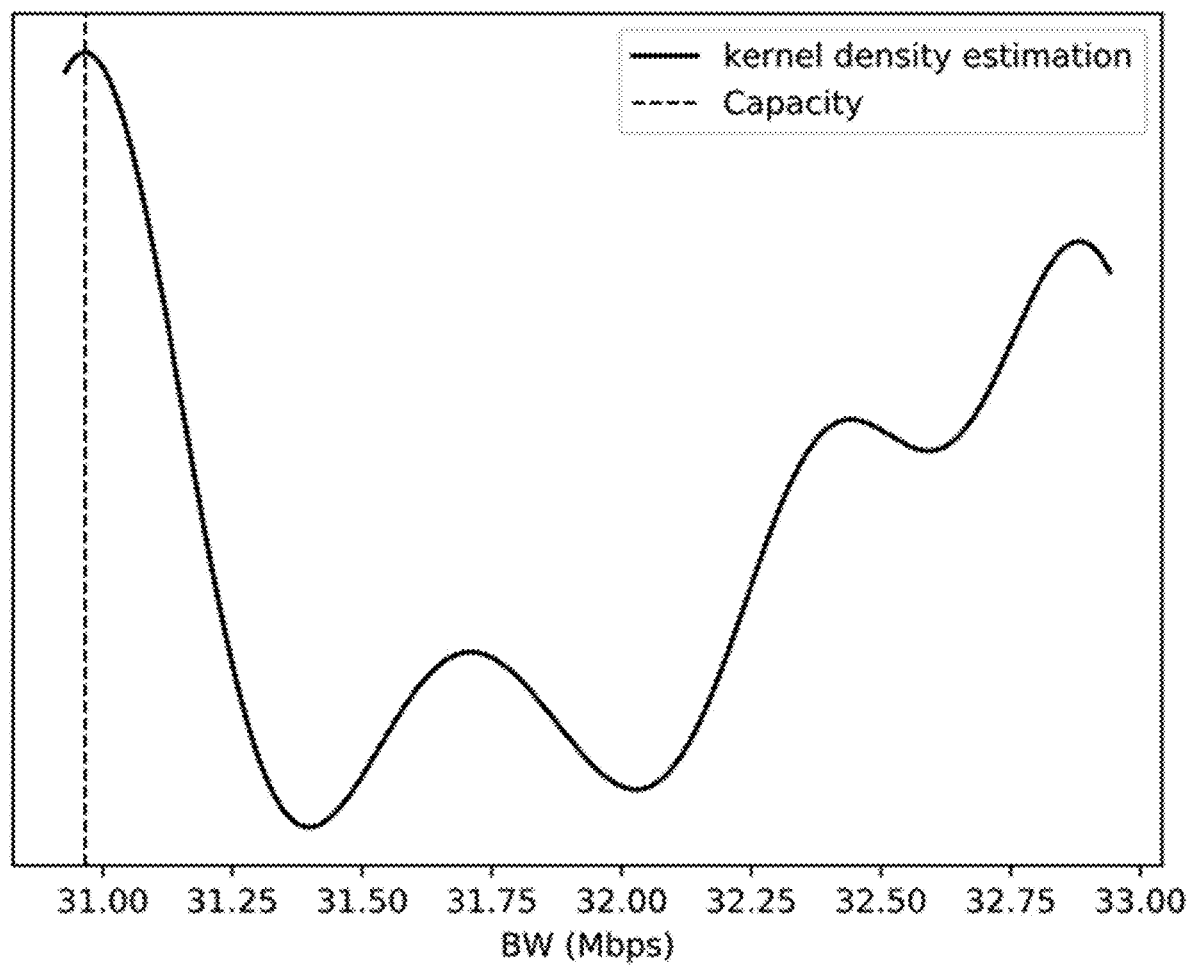
FIG. 14 illustrates narrow link capacity obtained by studying the distribution obtained by means of kernel density estimation over the sample selected and after studying its global maximum.

A possible way to analyze packet dispersion is based on measuring both the inter-packet arrival time of packets and their latency. It can be implemented in a single sending node, needing a mechanism to reply to the packet probes (e.g. ICMP echo requests/reply, also known as ping). If the mechanism is implemented in two nodes located at the edges of the end-to-end path in analysis, one-way delay (OWD) can be measured instead of the RTT; in this last case, probe pairs could be any type of packet. Once packet dispersion and delay are measured, the estimator can analyze the dispersion patterns together with their delay on a tridimensional plane as shown in FIG. 13 to derive the smallest capacity link of the SLCS. In this case, the capacity module detects the capacity of the bottleneck of the SLCS shown in FIG. 9 (denoted as $O_1$). In an embodiment, the delay and inter-packet dispersion distributions are analyzed to filter out statistically irrelevant measurements. Once a specific set of measurements is isolated, a more precise outline of the inter-packet dispersion distribution can be obtained by using an estimator to derive its probability density function (PDF) from the discrete measurements obtained. Such an estimator could be a Kernel Density Estimator. Once the PDF of the filtered area is obtained, an analysis of the global maximum could provide the narrow link capacity estimation as shown in FIG. 14.

Figure 15:
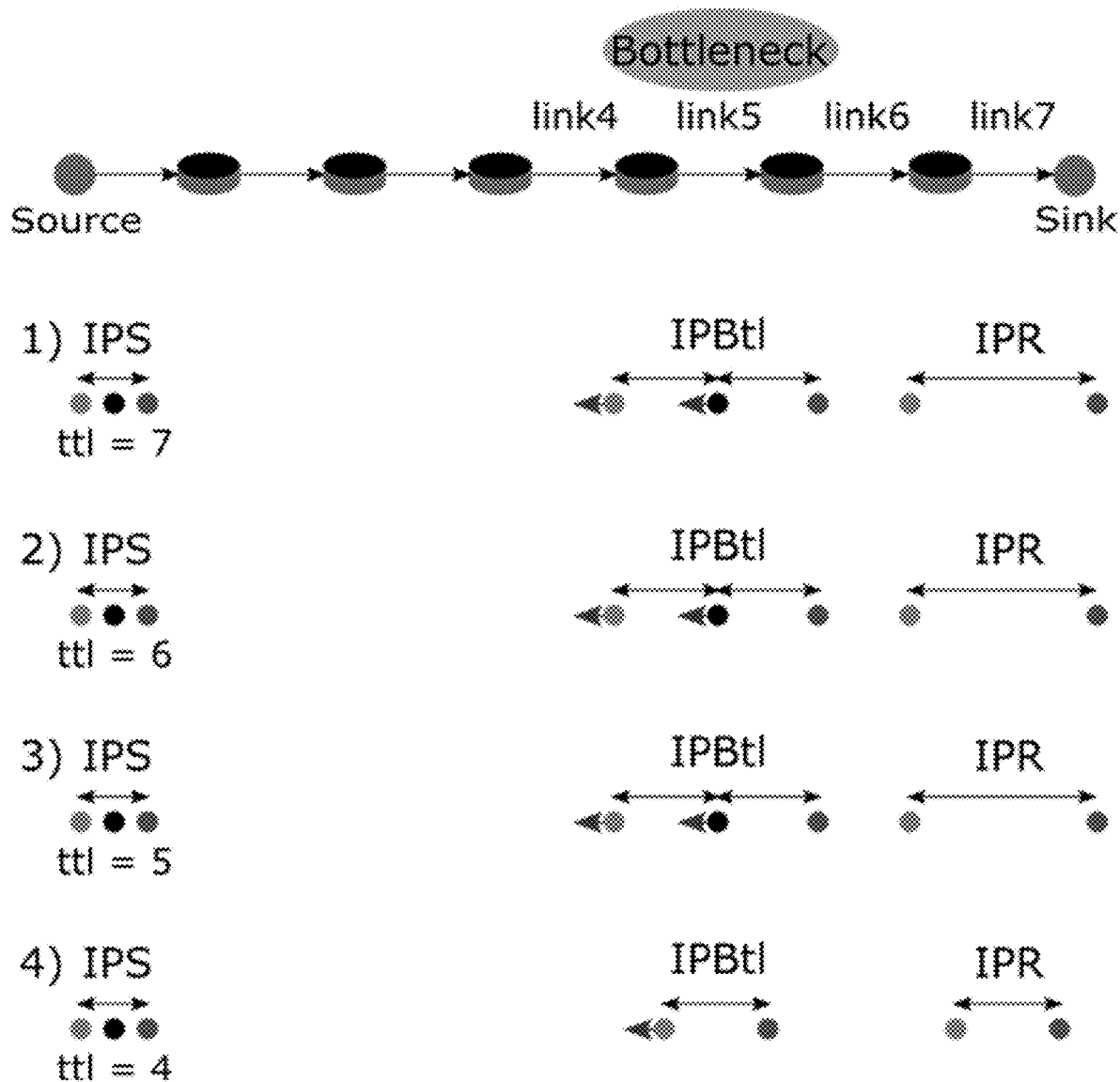
FIG. 15 illustrates that probing packet pair dispersion changes when TTL-expiring packets are dropped before the actual bottleneck (case 4), enabling its detection.

The same active probing component described previously could provide additional information to the controller by locating the narrow link on the path. This could be achieved by sending Time to Live (TTL) expiring packets between probing packet pairs and by studying the measuring packet pair dispersion afterward, as shown in FIG. 15. A way to proceed includes the following steps: 1) packet pair probes are sent at a low rate, even lower than the narrow link capacity; 2) in between packet pair probes, an arbitrary big number of packets is sent but with a small TTL value in their IP header, either decreasing it iteratively from the maximum number of hops on the measured path or starting from one and increasing it; 3) TTL-expiring packets will be dropped by intermediate routers when the TTL value decreases to zero; 4) such effect causes the packet pair dispersion behavior to change significantly when crossing the narrow link; when the TTL-expiring packets are dropped before reaching the narrow link, the packet pair dispersion will not be altered or at least its behavior will be different than the case described in 3). Such a methodology causes a different response from the network path when crossing the narrow link. This opens the possibility to locate it.

Figure 16:
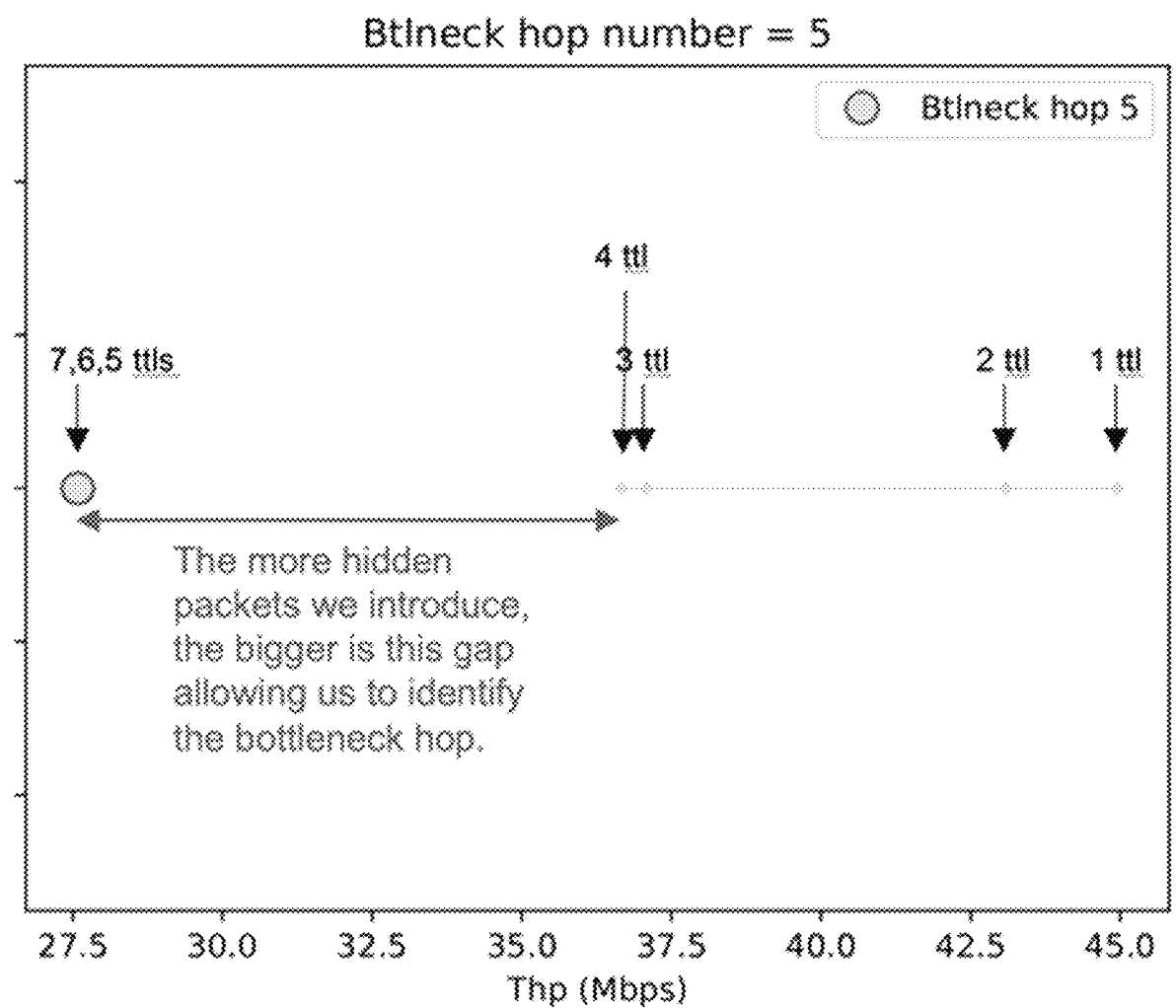
FIG. 16 illustrates an unsupervised clustering Gaussian mixture algorithm used to locate the bottleneck position in the environment shown in FIG. 9.

In an embodiment, a clustering algorithm is applied to the packet pair probes dispersion behavior measured to isolate the topological narrow link position as shown in FIG. 16.

The changes in packet rate dispersion when introducing expiring hidden packets between probing pairs allows the usage of such an algorithm to detect the narrow link position after an iterative measurement procedure.

Once the positions of the narrow links and the capacity of the narrow link of the path are determined, we can iteratively determine the capacity of the subsequent narrow links in the SLCS. If the position of the narrow link of the path is k and the capacity of the narrow link of the path is $C_k$, we can determine the capacity of the narrow link that immediately precedes it by sending a pair of packets with intermediate packets. These intermediate hidden packets must have TTL k, so that when they reach link k they will expire and the rate associated with the inter-packet of the remaining packets will be lower than the capacity of the k-th narrow link. The inter-packets that are received from the remaining packets together with their OWDs will constitute the triad to determine the rate R of the packet pair. The capacity C of the narrow link that precedes the one already discovered can be computed as described above; however, the value must be scaled accordingly to the number of hidden packets #N that have been injected with TTL equal to k, to finally obtain the real capacity of the narrow link that precedes the k-th, which is $C=R*(\#N+1)$. Starting with the one with the largest hop value down to the one with the lowest value, this method is performed iteratively to discover the capacity of all narrow links in the SLCS. The rate at which the subsequent probes are generated must match the last discovered narrow link capacity.

A multi-criteria, extendable network flow controller incorporates inputs from multiple sources, consolidates them and enforce the desired goals in terms of traffic prioritization, resources assignment and expected behavior. The non-transient criteria can be defined in the form of user policies, which entails the user's guidelines to the controller. The latter 'promises' to enforce them, or continuously work toward that goal. On the other hand, the transient criteria derived from the near real-time resources' usage must be incorporated into the consolidation and enforcement process. This transient information is the result of both the ongoing and new incoming flows, and the prior enforcement decisions taken. Furthermore, in a distributed architecture, external criteria can be incorporated into the consolidation and enforcement process. This external criteria further extends the expected behavior by incorporating information not locally available.

A local agent with visibility of the resources' usage and traffic behavior collects relevant information in near real-time, to post process and provide context criteria to the flow controller. Temporal and historical flows' information is consolidated along with local resources' usage. This partial knowledge will help with the prediction of patterns that can potentially impact the flow controller consolidation and enforcement process. The patterns' classification seeks to differentiate and classify them in both local, and external ones. The former includes situations when there is a local problem either caused by an incorrect configuration, or an attack. The latter includes situations when the network links show inconsistencies in the form of packets losses, round trip time variability and others.

The present invention has been described above in connection with several preferred embodiments. This has been done for purposes of illustration only, and variations of the inventions will be readily apparent to those skilled in the art and also fall within the scope of the invention.

The invention claimed is:

1. A method for determining a performance characteristic of a network connection comprising the steps of:
   sending a plurality of first packets;
   receiving a plurality of second packets, wherein said second packets comprise acknowledgement packets of said first packets and wherein one or more of said second packets are cumulative acknowledgements of a plurality of first packets;
   determining inter-packet arrival times of a plurality of the second packets;
   detecting a pattern in a distribution of a plurality of the inter-packet arrival times; and
   computing a performance metric of a network connection based on the step of detecting a pattern, wherein said performance metric is selected from the set consisting of available bandwidth and link capacity values of the smallest links capacity set.

2. The method of claim 1 wherein said step of detecting a pattern in a distribution is based on an analysis of packet dispersion.

3. The method of claim 1 wherein said step of detecting a pattern in a distribution utilizes a machine learning mechanism.

4. The method of claim 1 further comprising the step of:
   selecting a subset of the plurality of packets for use by said step of detecting a pattern in a distribution.

5. The method of claim 4 wherein said step of selecting a subset is based on a measurement of a round trip time.

6. The method of claim 1 wherein said step of determining inter-packet arrival times is based on evaluating inter-packet arrival time of acknowledgements of a TCP flow.

7. The method of claim 1 wherein said step of determining inter-packet arrival times is based on actively probing a network by sending a plurality of packets within a predetermined time window.

8. The method of claim 1 wherein the step of computing a performance metric comprises estimating the available bandwidth of a path through a network.

9. The method of claim 1 wherein the step of computing a performance metric comprises estimating the capacity of a set of links of an end-to-end path that includes a narrow link in at least one of the sub-segments of the path.

10. The method of claim 1 wherein said step of determining inter-packet arrival times and said step of detecting a pattern in a distribution take place on a plurality of network nodes communicating over a network.

11. The method of claim 1 wherein said first packets comprise user data.

12. The method of claim 1 wherein said first packets represent test packets.

13. A method for determining a performance characteristic of a network connection comprising the steps of:
   sending a plurality of first packets;
   receiving a plurality of second packets, wherein said second packets comprise acknowledgement packets of said first packets;
   determining inter-packet arrival times of a plurality of the second packets;
   detecting a pattern in a distribution of a plurality of the inter-packet arrival times wherein said step of detecting a pattern in a distribution builds a live histogram of the acknowledgement inter-packet rate; and
   computing a performance metric of a network connection based on the step of detecting a pattern, wherein said performance metric is selected from the set consisting of available bandwidth and link capacity values of the smallest links capacity set.

14. The method of claim 13 wherein said step of detecting a pattern in a distribution is based on an analysis of packet dispersion.

15. The method of claim 13 wherein said step of detecting a pattern in a distribution utilizes a machine learning mechanism.

16. The method of claim 13 wherein said step of detecting a pattern in a distribution is based on an analysis of packet dispersion.

17. The method of claim 13 wherein said step of detecting a pattern in a distribution utilizes a machine learning mechanism.

18. The method of claim 13 further comprising the step of:
selecting a subset of the plurality of packets for use by said step of detecting a pattern in a distribution.

19. The method of claim 18 wherein said step of selecting a subset is based on a measurement of a round trip time.

20. The method of claim 13 wherein said step of determining inter-packet arrival times is based on evaluating inter-packet arrival time of acknowledgements of a TCP flow.

21. The method of claim 13 wherein said step of determining inter-packet arrival times is based on actively probing a network by sending a plurality of packets within a predetermined time window.

22. The method of claim 13 wherein the step of computing a performance metric comprises estimating the available bandwidth of a path through a network.

23. The method of claim 13 wherein the step of computing a performance metric comprises estimating the capacity of a set of links of an end-to-end path that includes a narrow link in at least one of the sub-segments of the path.

24. The method of claim 13 wherein said step of determining inter-packet arrival times and said step of detecting a pattern in a distribution take place on a plurality of network nodes communicating over a network.

25. The method of claim 13 wherein one or more of said second packets are cumulative acknowledgements of a plurality of first packets.

26. The method of claim 13 wherein said first packets comprise user data.

27. The method of claim 13 wherein said first packets represent test packets.

\* \* \* \* \*